Patented Mar. 13, 1934

1,951,250

UNITED STATES PATENT OFFICE 1,951,250

PROCESS OF PRODUCING CALCIUM BUTYRATE

Hanns Georg Maister, Freising, Germany

No Drawing. Application September 27, 1930,
Serial No. 484,935

7 Claims. (Cl. 260—120)

An object of my invention is the production of butyric acid, and its homologues, by fermentation of the slop obtained in distilleries using cane sugar molasses, the product being preferably obtained in the form of the calcium salt.

The chemical processes involved in the breaking down of sugar by certain bacteria, producing butyric acid, having in the main been revealed by the researches of Neuberg (Biochemische Zeitschrift, volume 122, page 144). In the early stages they are analogous to the zymase fermentation of yeast, the sugar of the C6 series being converted into methylglyoxal, with intermediate formation of a carbohydrate-phosphoric acid ester, and the methylglyoxal being converted by dehydration in pyroracemic acid. In the course of butyric acid fermentation, classed by Neuberg as the fourth type of fermentation, part of the pyroracemic acid may be converted into acetic aldehyde and alcohol, but in the main it is synthesized to a body from which butyric acid is formed by separation of carbon dioxide. As the intermediate products do not take up hydrogen, some hydrogen is evolved, besides carbon dioxide.

The buteric acid bacteria for which the breaking down of the sugar supplies food are anaerobic spore producers, and anaerobic fermentations are difficult to carry out on a large scale. In view of this it has been proposed to effect the fermentation with raw cultures of butyric acid bacteria containing in addition to anaerobic spore producers aerobic spore producers, which consume the oxygen occurring in the fermenting medium, the cultures being made in bruised grain mash, garden soil or the contents of the intestines of vegetarian animals. The raw culture for the improved process which I am about to describe is made by treating potatoes in a particular way.

Taking the unwashed tuber, several wounds are made therein, about 2 or 3 cm. deep, a blunt pin being used, which allows the wound to close after withdrawal. Then the potato is superficially cleaned and dipped several times in liquid paraffin to give it an airtight coating, and with this coating on it is kept for several days. Bacteriological action sets in at the wounded parts, resulting in partial liquefaction of the pulp. From these parts the substance for inoculation is taken, and is introduced into a sterile nutrient solution containing yeast autolysate. After four or five transfers to further nutrient solutions the raw culture is ready for use. I have found that with proper care raw cultures of very uniform fermentative power are obtainable.

Tests made with various substances, e. g. molasses, suitable for the production of butyric acid by fermentation, have shown that with the raw culture produced as described the yield, calculated with respect to fermentable sugar, may far exceed that which is theoretically indicated.

This result compels one to the assumption that butyric acid is produced not only from the sugar, but also from the substances derived from the breaking down of albumen (amino acids), as in the anologous case of alcoholic fermentation of amino acids described by Felix Ehrlich (Biochemische Zeitschrift, volume 2, page 52; volume 18, page 391; volume 36, page 477; and volume 105, page 232), where yeast fermentation produces fusel oil.

One of the cheap waste products of distillers, rich in partly decomposed albumen, is the cane molasses slop, in which the albumen of the yeast cells is largely broken down. Normally the wash contains no fermentable sugar, so some sugar, in the form of molasses, must be added. Early tests made with this material led to production of butyric acid, but in unsatisfactory quantities, probably due to constituents of the slop and molasses which obstructed fermentation. I have, however, overcome this defect in the following way.

In the mash of wash and molasses I produce yeast fermentation with a hydrogen ion concentration of pH 4.8–5.0. This I check after a short time with lime milk, nearly neutralizing the mash and allowing the fermenting temperature to rise above 30° C. After checking the yeast fermentation, but before the rise of temperature, I add the raw culture of butyric acid bacteria, which quickly starts fermentation, with brisk evolution of gas. The rise of temperature from 30° C. extends over several hours and stops at 45° C. During this period the yeast cells are autolyzed and their albumen is broken down by proteolytic enzyme, producing in the mash a medium suitable for the activity of the butyric acid bacteria. The maximum output of butyric acid occurs after about 6 or 7 days fermentation at 45° C. In order to maintain the optimum hydrogen concentration for the butyric acid bacteria I add washed chalk to the mash, so that the fatty acids produce calcium salts. I find also that it is of great advantage to add hydrolyzed vegetable albumen during the fermentation, as this not only increases the production of butyric acid, but also accelerates it.

The following example illustrates the process.

To 1400 gr. of thick cane, molasses slop, having a concentration of 36° Bé. and a nitrogen content of 1.31%, were added 200 gr. cane molasses, having a sugar content (calculated as invert sugar) of 51.9%, and the volume was raised to 8 l., with a hydrogen ion concentration of pH 5. Alcoholic fermentation was started by means of brandy yeast. After four hours fermentation at 30° C. the mash was nearly neutralized by means of milk of lime, and 300 gr. of whitening were added. At the same time the mash was inoculated with a raw culture obtained as described hereinbefore.

The temperature was slowly increased from 30° C., reaching 45° C. after 24 hours. During this period autolysis of the yeast cells occurred, clearly assisting the fermentation. At the temperature of 45° C. production of butyric acid and its homologues takes place for several days. On the second and third days of fermentation hydrolyzed vegetable albumen was introduced as food for the bacteria, such as, for example, defatted earth-nut meal hydrolyzed with sulphuric acid, the quantity being in the aggregate 800 ccm. of hydrolysate with a content of 4.6 gr. amino nitrogen, determined by Van Slyke's method. The fermentation was finished in six days, the result being shown in the following table:—

| Time | pH | Content of 100 ccm. of mash (in grams) | | | | | Aggregate of butyric acid formed (in grams) |
|---|---|---|---|---|---|---|---|
| | | Acetic acid | | Butyric acid | | Lactic acid | |
| | | Free | Fixed | Free | Fixed | | |
| 1st day | 7.1 | 0.075 | 0.205 | 0.008 | 0.848 | 0.823 | 67.8 |
| 2d day | 6.0 | 0.056 | 0.2 | 0.027 | 1.423 | 0.83 | 113.8 |
| 3d day | 6.0 | 0.056 | 0.19 | 0.065 | 1.645 | 0.832 | 131.6 |
| 4th day | 6.1 | 0.026 | 0.17 | 0.117 | 1.863 | 0.829 | 148.0 |
| 5th day | 7.1 | 0.024 | | 0.16 | 2.9 | 0.834 | 232.0 |
| 6th day | 7.1 | 0.013 | | 0.065 | 3.2 | 0.846 | 255.6 |

The unused chalk having been separated by filtration, the filtrate was mixed with the calculated quantity of sulphuric acid and subjected to thorough steam distillation. The distillate, containing the butyric acid and lower fatty acids, was exactly neutralized with chalk and milk of lime, again filtered for complete purification, and dried in vacuo.

In this example, where the cane molasses slop contained no fermentable sugar, only 103.8 gr. of sugar were present in solution. As 1 molecule of sugar of the $C_6$ series furnishes 1 molecule of butyric acid, the theoretical yield from 103.8 gr. of sugar is 50.8 gr. of butyric acid. In fact, the yield was much higher in the example stated, as in round figures 240 gr. purified raw calcium butyrate was found to be present. This result can only be explained by assuming that albumenous bodies, in addition to the sugar, furnished raw material for the butyric acid bacteria.

What I claim as my invention and desire to secure by Letters Patent of the United States is:—

1. A process of producing crude butyric acid, which comprises adding a substance containing fermentable sugar to a molasses slop, producing alcoholic fermentation in the mixture by yeast, later inhibiting the yeast fermentation by changing the acid content and the temperature of the mixture, and then fermenting the mixture with butyric acid bacteria.

2. A process of producing crude calcium butyrate, which comprises adding a substance containing fermentable sugar to a molasses slop, producing alcoholic fermentation in the mixture by yeast, later inhibiting the yeast fermentation by changing the acid content and the temperature of the mixture, and then fermenting the mixture with butyric acid bacteria, neutralizing the fermented liquid with calcium carbonate and treating the mass to separate the calcium butyrate.

3. A process of producing crude calcium butyrate, which comprises adding a substance containing fermentable sugar to a molasses slop, producing alcoholic fermentation in the mixture by yeast, later inhibiting the yeast fermentation by changing the acid content and the temperature of the mixture, and then fermenting the mixture with butyric acid bacteria, introducing hydrolyzed albumen and calcium carbonate into the mixture, and treating the fermented mass to separate the calcium butyrate.

4. A process of producing butyric acid, which comprises adding a substance containing fermentable sugar to a molasses slop, producing alcoholic fermentation in the mixture by yeast, later inhibiting the yeast fermentation by changing the acid content and the temperature of the mixture, and then fermenting the mixture with butyric acid bacteria, neutralizing the fermented liquid with calcium carbonate and treating the mass to separate the calcium butyrate, separating the residual calcium carbonate from the fermented mass by filtration, adding a mineral acid to the fermented mass to decompose the calcium butyrate therein, and subjecting the mass to steam distillation.

5. A process of producing butyric acid, which comprises adding a substance containing fermentable sugar to a molasses slop, producing alcoholic fermentation in the mixture by yeast, later inhibiting the yeast fermentation by changing the acid content and the temperature of the mixture, and then fermenting the mixture with butyric acid bacteria, introducing hydrolyzed albumen and calcium carbonate into the mixture, separating the residual calcium carbonate from the fermented mass by filtration, adding a mineral acid to the fermented mass to decompose the calcium butyrate therein, and subjecting the mass to steam distillation.

6. A process of producing calcium butyrate, which comprises adding a substance containing fermentable sugar to a cane molasses slop, producing alcoholic fermentation in the mixture by yeast, later inhibiting the yeast fermentation by changing the acid content and the temperature of the mixture, and then fermenting the mixture with butyric acid bacteria, neutralizing the fermented liquid with calcium carbonate, separating the residual calcium carbonate from the fermented mass by filtration, adding a mineral acid to the fermented mass to decompose the calcium butyrate therein, subjecting the mass to steam distillation, neutralizing the distillate with an alkaline calcium compound, and drying the neutral distillate.

7. A process of producing calcium butyrate, which comprises adding a substance containing fermentable sugar to a cane molasses slop, producing alcoholic fermentation in the mixture by yeast, later inhibiting the yeast fermentation by changing the acid content and the temperature of the mixture, and then fermenting the mixture with butyric acid bacteria, introducing hydrolyzed albumen and calcium carbonate into the mixture, treating the fermenting mass to separate the calcium butyrate, separating the residual calcium carbonate from the fermented mass by filtration, adding a mineral acid to the fermented mass to decompose the calcium butyrate therein, subjecting the mass to steam distillation, neutralizing the distillate with an alkaline calcium compound, and drying the neutral distillate.

HANNS GEORG MAISTER.